(12) United States Patent
Mozer et al.

(10) Patent No.: US 6,665,639 B2
(45) Date of Patent: Dec. 16, 2003

(54) SPEECH RECOGNITION IN CONSUMER ELECTRONIC PRODUCTS

(75) Inventors: Todd F. Mozer, Sunnyvale, CA (US); Forrest S. Mozer, Berkeley, CA (US); Thomas North, Soquel, CA (US)

(73) Assignee: Sensory, Inc., Santa Clara, CA (US)

( * ) Notice: Subject to any disclaimer, the term of this patent is extended or adjusted under 35 U.S.C. 154(b) by 0 days.

(21) Appl. No.: 10/051,838

(22) Filed: Jan. 16, 2002

(65) Prior Publication Data

US 2002/0091513 A1 Jul. 11, 2002

Related U.S. Application Data

(63) Continuation of application No. 09/328,656, filed on Jun. 9, 1999, now abandoned, which is a continuation-in-part of application No. 08/822,852, filed on Mar. 24, 1997, now abandoned.

(60) Provisional application No. 60/032,788, filed on Dec. 6, 1996.

(51) Int. Cl.[7] ............................................. G10L 15/06
(52) U.S. Cl. ...................... 704/244; 704/252; 704/270; 704/232; 706/39
(58) Field of Search ................................. 704/243, 244, 704/259, 270, 275, 276, 232, 251, 253; 368/63, 281; 706/25, 39

(56) References Cited

U.S. PATENT DOCUMENTS

| | | |
|---|---|---|
| 3,742,143 A | 6/1973 | Awipi |
| 4,049,913 A | 9/1977 | Sakoe |
| 4,388,495 A | 6/1983 | Hitchcock |

(List continued on next page.)

OTHER PUBLICATIONS

Bell, H.A. and D. Hull, an Equipment Concept for Speech Recognition, Colloquium on "Some Aspects of Speech Recognition for Man–Machine Communications," London, UK, Apr. 23, 1968, Institute of Elect. Engineers, 1968.

Bezdel, W. and R.W.A. Scarr, Approaches to Speech Recognition Equipment Based on Zero Crossings and Other Speech Features, Colloquium on "Some Aspects of Speech Recognition for Man–Machine Communications," London, UK, Apr. 23, 1968, Institute of Elect. Engineers, 1968.

(List continued on next page.)

*Primary Examiner*—Richmond Dorvil
*Assistant Examiner*—Abul K. Azad
(74) *Attorney, Agent, or Firm*—Townsend and Townsend and Crew LLP

(57) ABSTRACT

A method and apparatus are described that allow inexpensive speech recognition in applications where this capability is not otherwise feasible because of cost or technical reasons, or because of inconvenience to the user. A relatively simple speaker independent recognition algorithm, capable of recognizing a limited number of utterances at any one time, is associated with the base unit of an electronics product. To function, the product requires information from an external medium and this medium also provides the data required to recognize several sets of utterances pertinent to other information provided by the external medium.

35 Claims, 4 Drawing Sheets

U.S. PATENT DOCUMENTS

| | | | |
|---|---|---|---|
| 4,882,685 A | | 11/1989 | Van der Lely |
| 5,281,143 A | | 1/1994 | Arad et al. |
| 5,285,552 A | | 2/1994 | Leifeld et al. |
| 5,297,183 A | | 3/1994 | Bareis et al. |
| 5,313,531 A | | 5/1994 | Jackson |
| 5,355,433 A | | 10/1994 | Yasuda et al. |
| 5,444,673 A | | 8/1995 | Mathurin |
| 5,475,792 A | * | 12/1995 | Stanford et al. ............ 704/227 |
| 5,513,298 A | * | 4/1996 | Stanford et al. ............ 704/243 |
| 5,528,728 A | | 6/1996 | Matsuura et al. |
| 5,583,964 A | | 12/1996 | Wang |
| 5,600,753 A | | 2/1997 | Iso |
| 5,621,862 A | | 4/1997 | Nakahira et al. |
| 5,625,707 A | | 4/1997 | Diep et al. |
| 5,634,087 A | | 5/1997 | Mammone et al. |
| 5,696,877 A | | 12/1997 | Iso |
| 5,737,485 A | | 4/1998 | Flanagan et al. |
| 5,749,066 A | | 5/1998 | Nussbaum |
| 5,790,754 A | | 8/1998 | Mozer et al. |
| 5,794,204 A | | 8/1998 | Miyazawa et al. |
| 5,794,205 A | | 8/1998 | Walters et al. |
| 5,812,992 A | | 9/1998 | Vries |
| 5,813,026 A | | 9/1998 | Borg et al. |
| 5,915,001 A | * | 6/1999 | Uppaluru ................. 379/88.22 |
| 5,920,852 A | | 7/1999 | Graupe |
| 6,021,387 A | | 2/2000 | Mozer et al. |
| 6,151,592 A | | 11/2000 | Inazumi |
| 6,205,556 B1 | | 3/2001 | Watanabe et al. |

OTHER PUBLICATIONS

Bunge, E., Automatic Speaker Recognition By Computers, 1975 Carnahan Conference On Crime Countermeasures, ed. J.S. Jackson, pp. 23–28, 1975.

Fawe, A.L. Reconnaissance De Le Parole A Partir Des Passages Par Zero, Revue HF, vol. 10, pp. 296–298, 1978. The Abstract is provided entitled "Word Recognition by Zero Crossings" (one page).

Fry, D.B., Prospects and Problems in Mechanical Speech Recognition, Colloquium on "Some Aspects of Speech Recognition for Man–Machine Communications," London, UK, Apr. 23, 1968, Institute of Elect. Engineers, 1968.

Glenn, J.W., and M.H. Hitchcock, With a Speech Pattern Classifier, Computer Listens to Its Master's Voice, Electronics, vol. 44, pp. 84–89, 1971.

Lavington, S.H., Problems in Automatic Speech Recognition, Colloquium on "Some Aspects of Speech Recognition for Man–Machine Communications," London, UK, Apr. 23, 1968, Institute of Elect. Engineers, 1968.

Lenaerts, E. H., Talking to The Computer, New Scientist, vol. 44, 498–501, 1969.

Lummis, R.C., Speaker Verification: A Step Toward, The 'Checkless' Society, Bell Laboratories Record, vol. 50, pp. 254–259, 1972.

Neiderjohn, R.J. and P.F. Castelaz, Zero–Crossing Analysis Methods for Speech Recognition, Proceedings of the 1978 Conference on Pattern Recognition and Image Processing, IEEE, pp. 507–513, 1978.

Newal, A.F., Spectral Analysis Using a Filter Bank and PDP8 Computer, Colloquium on "Some Aspects of Speech Recognition for Man–Machine Communications," London, UK, Apr. 23, 1968, Institute of Elect. Engineers, 1968.

Pay, B.E., User Requirements of Speech Recognition Machines, Colloquium on "Some Aspects of Speech Recognition for Man–Machine Communications," London, UK, Apr. 23, 1968, Institute of Elect. Engineers, 1968.

Purton, R.F., An Automatic Word Recognizer Based on Autocorrelation Analysis, Colloquium on "Some Aspects of Speech Recognition for Man–Machine Communications," London, UK, Apr. 23, 1968, Institute of Elect. Engineers, 1968.

Makhoul, J.I., Speaker–Machine Interaction In a Limited Speech Recognition System, Proceedings of the 78$^{th}$ Meeting of the Acoustical Society of America, San Diego, CA, Acoustical Society of America, New York, 1969.

Raibiner, "Applications of Voice Processing to Telecommunications," *Proceedings of the IEEEi*, vol. 82, No. 2 (Feb. 1994), pp. 199–228.

Reddy, D.R., Speech Input Terminals for Computers: Problems and Prospects, Proceedings of the 1970 IEEE International Computer Group Conference, IEEE, pp. 282–289, 1970.

Rochester, L.R., J.N. Gowdy, and J.K. Bryan, Comparison of Speech Recognition Systems Based on FFTs and Zero Crossings, Proceedings of Southeastcon, IEEE, pp. 178–181, 1979.

Sambur, M.R., and L.R. Rabiner, A Speaker–Independent Digit–Recognition System, Bell System Technical Journal, vol. 54, pp. 81–102, 1975.

Turn, R.A. Hoffman,and T. Lippiatt, Military Applications of Speech Understanding Systems, Rand Corp., Santa Monica, CA 1974.

Yasaki, E.K., Voice Recognition Comes of Age, Datamation, pp. 65–68, 1976.

\* cited by examiner

SPEECH RECOGNITION IN CONSUMER ELECTRONIC PRODUCTS

STATEMENT OF RELATED APPLICATIONS

This application is a continuation of claims the benefit of U.S. patent application Ser. No. 09/328,656, filed Jun. 9, 1999, now abandoned which is a continuation-in-part of and claims the benefit of U.S. patent application Ser. No. 08/822,852, filed Mar. 24, 1997, now abandoned which claims priority from U.S. Provisional Application Serial No. 60/032,788, filed Dec. 6, 1996. The 09/328,656, 08/822,852, and 60/032,788 are hereby incorporated herein by reference.

The present application is a continuation-in-part application of U.S. patent application Ser. No. 08/822,852, filed Mar. 24, 1997, which claims priority from U.S. Provisional Patent Application Serial No. 60/032,788, filed Dec. 6, 1996, the contents of both being incorporated herein for all purposes.

BACKGROUND OF THE INVENTION

The present invention relates to speech recognition and more particularly to inexpensive and user friendly speech recognition techniques.

Speech recognition has been extensively studied for several decades because of its interest on intellectual grounds and because of its military and commercial applications. Some of the commercial applications involve speaker verification and improving the man-machine interface (e.g., U.S. Pat. Nos. 3,742,143; 4,049,913; 4,882,685; 5,281,143; and 5,297,183). As evidence of the extensive research on speech recognition, the U.S. Patent Office has granted more than 600 patents on speech recognition or related topics in the last three decades and as many as 10,000 articles have appeared in the scientific or engineering literature during that time.

Generally, a speech recognition device analyzes an unknown audio signal to generate a pattern that contains the acoustically significant information in the utterance. This information typically includes the audio signal power in several frequency bands and the important frequencies in the waveform, each as a function of time. The power may be obtained through the use of bandpass filters (e.g., U.S. Pat. No. 5,285,552) or fast Fourier transforms (i.e., FFTs) (e.g., U.S. Pat. No. 5,313,531). The frequency information may be obtained from the FFTs or by counting zero crossings in the filtered input waveform (U.S. Pat. No. 4,388,495).

Speech recognition devices can be classified as "speaker dependent" or "speaker independent." Speaker dependent devices require that the user train the system by speaking all of the utterances in the entire recognition set several times. Speaker independent devices do not require such training because the acoustic cues obtained from many repetitions of the utterances in the recognition set, as spoken by many different speakers, are used to train the recognizer to recognize an unknown utterance by a speaker whose phrase was not part of the training set.

Commercial applications of both speaker independent and speaker dependent recognition are becoming prevalent for applications such as voice activated phone dialing, computer command and control, telephone inquiries, voice recorders, electronic learning aids, data entry, menu selection, and data base searching. The growth of the speech recognition marketplace results from the decreasing cost of computing power and recognition technology as well as the need for more friendly user interfaces.

In some applications, speaker dependent recognition is required because the user must input information that he/she later requests. An example is voice dialing, which is being test marketed by U.S. West among others, in which the user verbally enters a directory of names and phone numbers. This information is later solicited by using speaker dependent recognition when the user wishes to make a phone call. Except for applications such as voice dialing that require speaker dependent recognition, this technology has not achieved wide market acceptance because it is not user-friendly due to the required training.

Much of the interest in speaker independent recognition is because of the simpler user interface. An example of a speaker independent recognition software package running on personal computers is VOICE Release 2.0 from Kurzweil AI, which is able to recognize as many as 60,000 words without user training. Other examples of similar technologies are the IBM Voice Type 3.0, used in radiology, the Wild Card LawTALK, used in legal applications, and the Cortex Medical Management, used for anatomic pathology. More than two dozen speaker independent recognition computer products are available and they all require considerable computing power to perform the sophisticated natural language processing involving context, semantics, phonetics, prosody, etc., that is required to recognize very large sets of utterances without user training. Hence, large vocabulary, speaker independent recognition products require considerable computing power.

Small vocabulary, speaker independent recognition also appears in commercial applications where the number of utterances to be recognized is limited. Examples are the Sensory, Inc. speaker independent recognition LSI chip (U.S. patent application Ser. No. 08/327,455) used in electronic learning aids such as the Fisher-Price Radar product, or in time setting applications such as the VoiceIt clock. This technology is accurate and inexpensive but, in the current art, it is limited to use with relatively small vocabularies because the LSI chip does not contain the computing power required for natural language processing or the memory required to store information about a very large inventory of recognition words.

The above described limitations of current recognition technology narrow the range of its applicability in consumer electronic products. For example, it would be desirable to select a particular song from a compact disk changer that holds many compact disks by telling it which disk and which song on that disk you wish to hear. This is not currently feasible because solving this problem with speaker dependent recognition requires that the user repeat the names of all recordings on every compact disk that he owns, while solving it with speaker independent technology would require that the recognizer be able to understand the name of every song on every compact disk in the world. Or, consider the use of speech recognition during the interaction of a surfer with an internet website. Most of this interaction is at a simple one-step-at-a-time level where the vocabulary to be recognized at each step is small but the total vocabulary associated with all of the steps may be large. For this application, speaker dependent recognition may not be feasible because of its inconvenience. Speaker independent recognition is feasible, but, in the current art, analyzing the speech by the web site's main processor creates conflicts between the recognition program and the application and may slow down the application to the point that use of recognition becomes unacceptable to the user. Also, adding additional processing power to handle the speaker independent recognition may not be feasible due to its cost.

SUMMARY OF THE INVENTION

The present invention provides an inexpensive and user-friendly speaker independent speech recognition system. A speech recognition system according to the present invention may function without the use of natural language processing or internal storage of large amounts of speech recognition data.

In one embodiment, an inexpensive, speaker independent recognition engine is placed in the base unit of an electronic apparatus. Depending on the application, the base unit may be a compact disk player, computer, internet access device, video game player, television set, telephone, etc. The recognition engine may be a software program running in a general purpose microprocessor or an LSI chip such as the Sensory RSC-164 available from the assignee of the present application. Since the recognition engine should be inexpensive, it may be capable of recognizing only a limited set of utterances at any one time, although this recognition set of utterances may change from one application of recognition to the next in the same base unit.

The architecture of the product is such that, in operation, an external medium is connected to the base unit. The external medium may be a compact disk if the base unit is a compact disk changer, a floppy disk if the base unit is a computer, a video game cartridge if the base unit is a video game player, a cable or rf transmission if the base unit is a television set or an internet access device, a phone cable if the base unit is a telephone, etc. Included in the information provided to the base unit by the external medium is the data required for the recognition engine to recognize a spoken utterance from a limited set of candidate utterances. As the interaction between the base unit and the user progresses, different sets of data may be supplied by the external medium to the recognition engine in the base unit in order to allow different recognition sets at different times in the interaction.

Or, in some applications, only one or two data sets might ever be supplied from the external medium to the base unit. Consider the case of a watch that utilizes speech recognition for setting the time. To function, this watch might require two speaker-independent recognition sets, the first of which would be the digits, and the second of which would be the words "set," "hours," "minutes," "seconds," and "done." A problem is that worldwide sales require that this watch perform speech recognition in any of dozens of languages. In the current art, this would require either that the watch manufacturer and retailers carry inventories of a large number of different units or that the watch is loaded with information in many languages, at an unacceptable expense. An alternative approach would be to include a small amount of programmable, non-volatile memory in the watch, and to download, from the Internet, the pertinent information for whatever language a purchaser wishes his watch to recognize. The voice prompts required to guide the user through setting the time would also be downloaded in the language of the user's choice in the same way. Downloading information to devices from the Internet is already a normal operation and watches with infra-red interfaces to computers are available in the market.

In accordance with a first aspect of the present invention, a base unit is provided wherein features of spoken utterances are analyzed by a programmable pattern recognition system to provide recognition results. A method of operating the base unit includes steps of programming the pattern recognition system to recognize a first set of words, operating the pattern recognition system as programmed to generate at least a first recognition result responsive to input speech, retrieving programming information for the pattern recognition system from a source external to the base unit responsive to the first recognition result and reprogramming the pattern recognition system to recognize a second set of words selected responsive to the first recognition result.

In accordance with a second aspect for he present invention, a method for speaker-independent speech recognition includes steps of performing speaker-independent speech recognition of user utterances in a base unit, receiving, in the base unit, first information pertinent to the speech recognition from an external medium, and receiving, in the base unit, second information independent from the first information and related to the user utterances from the external medium.

In accordance with a third aspect of the present invention, a method for speaker-independent speech recognition includes steps of downloading from an external medium into a base unit the information required for the speech recognition to operate in a selected one or a few of several different languages.

A further understanding of the nature and advantages of the inventions here may be realized by reference to the remaining portions of the specification and the attached drawings.

DESCRIPTION OF THE SPECIFIC EMBODIMENTS

Figure 1:
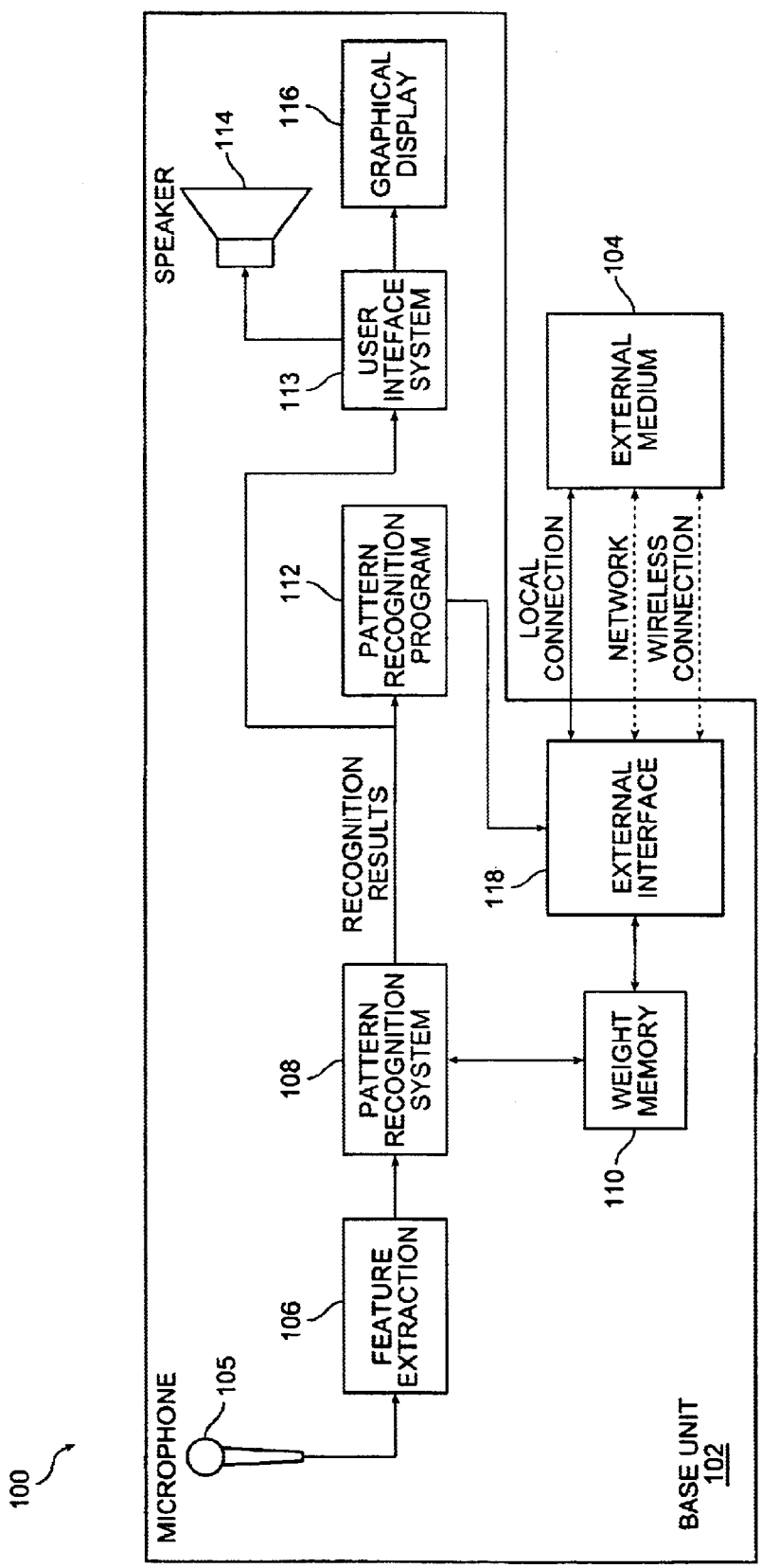
FIG. 1 depicts a general representation of an apparatus incorporating speech recognition according to one embodiment of the present invention.

FIG. 1 depicts a general representation of an apparatus 100 incorporating speech recognition according to one embodiment of the present invention. Apparatus 100 includes a base unit 102 and an external medium 104. Apparatus 100 may provide speech recognition capabilities to, for example, various electronic appliances such as a compact disk changer, telephone, computer, television, watch, etc. Components of apparatus 100 may perform other functions besides speech recognition in the context of such appliances.

Base unit 100 includes a microphone 105, a feature extraction unit 106, a programmable pattern recognition system 108, a weight memory 110, a pattern recognition programmer 112, a user interface system 113, a speaker 114, a graphical display 116, and an external interface 118. It is to be understood that not all of these elements are required for any particular embodiment of the present invention. Also, many of the depicted elements are implementable in either hardware or software.

Microphone 105 accepts user speech utterances and converts them to an analog electrical signal. Feature extraction unit 106 converts the analog electrical signal to digital information and extracts features which characterize the input utterances to facilitate recognition. Feature extraction unit 106 may be implemented in any one of a number of ways in either hardware or software. One preferred implementation of feature extraction unit 106 is taught in co-assigned U.S. application Ser. No. 08/327,455, the contents of which are herein incorporated by references for all purposes.

Pattern recognition system 108 recognizes the spoken utterances based on the features extracted by feature extraction unit 106. Preferably, pattern recognition system 108 is a neural network that employs weights from weight memory 110. An example of such a neural network is found in U.S. application Ser. No. 08/327,455. Pattern recognition system 108 selects a recognition result for the input utterance from among members of a presently selected recognition set.

The weights have been previously developed by training the neural network with multiple examples of the specific utterances comprising the recognition set associated with these weights. For example, if the recognition set consists of the words "yes" and "no," several hundred examples of each of these words, collected from the same population that will use the product, might be used to train the neural network. Another set of weights might be associated with the digits from 0 through 9.

In accordance with the present invention, the recognition set and associated weight set may change over time. Thus, at a specific time in an application, pattern recognition system 108 might distinguish yes from no by using one weight set and, at another time, it might recognize the single digits by using the second weight set. In this way, a large number of different utterances can be recognized without any one recognition set being so large that a more sophisticated recognition engine is required.

Pattern recognition programming system 112 controls the selection of a current recognition set and weight set, at least partially in response to the recognition results generated by pattern recognition system 108. The user interface system presents output to the user through speaker 104 and/or graphical display 116. The information presented to the user may include prompts for input to microphone 105 or application specific information. User interface system 113 may incorporate a speech synthesis capability.

Pattern recognition programming system 112 employs external interface 118 to retrieve new recognition sets and weight sets into weight memory 110. External interface 118 may be a storage interface, e.g., an IDE or SCSI interface, a network interface as would be used with a local network, or a network interface to an internet or intranet. External interface 118 may also be modem for connection to a telephone line, a modem for connecting to a CATV network, or a wireless modem for sending and receiving electromagnetic transmissions. External medium 104 may be, e.g., a compact disk, a compact disk jukebox, a remote server, a web site, a floppy disk, a hard drive, a video game cartridge, etc. The connection between external interface 118 and external medium 104 may be a SCSI port, an IDE port, a telephone line, an intranet, the Internet, a CATV network, the airwaves, etc.

Software or computer code to implement any of the elements of FIG. 1 may be stored in, for example, a memory device, CD-ROM, floppy disk, hard drive, any computer-readable storage medium, etc.

Figure 2:
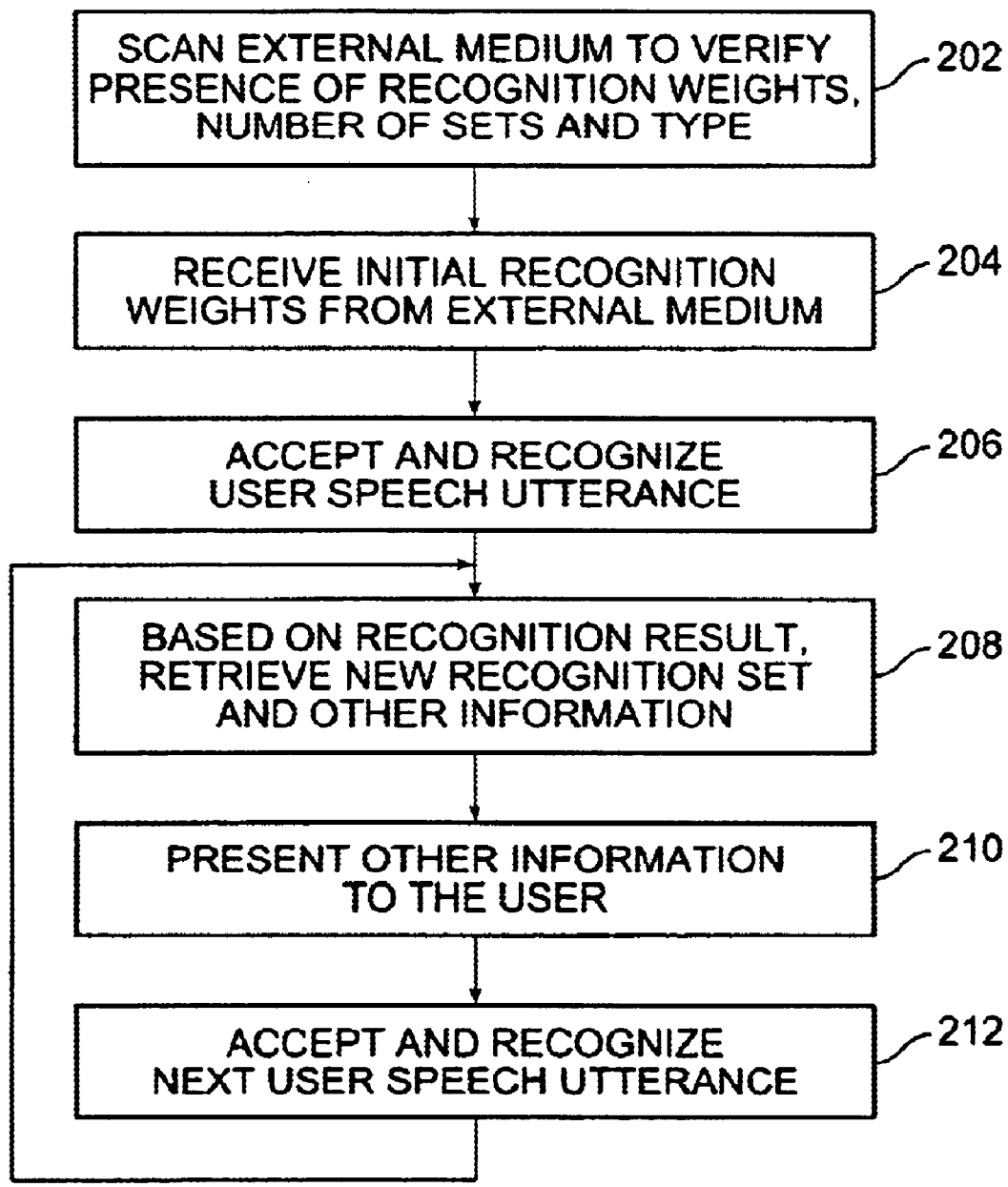
FIG. 2 is a flowchart describing steps of the operation of the apparatus of FIG. 1 in accordance with one embodiment of the present invention.

FIG. 2 is a flowchart describing steps of the operation of the apparatus of FIG. 1 in accordance with one embodiment of the present invention. At step 202, pattern recognition programming system 112 accesses external medium 104 to verify it in fact contains recognition set data and weight set data of the kind employed by pattern recognition system 108 and to determine the number of recognition sets and associated weight sets stored there. At step 204, pattern recognition programming system 212 retrieves an initial set of words and associated weight set into weight memory 110. At step 206, microphone 105 picks up a user's speech utterance. Feature extraction unit 106 develops a set of features to characterize the user utterance. Pattern recognition system 108 recognizes the utterance based on the weights currently stored on weight memory 110. The utterance may come in response to a prompt conveyed to the user by user interface system 113 via speaker 114 or graphical display 116.

At step 208, pattern recognition programming system 112 receives the recognition result and selects a new set of words and associated weight set based on this result. The new recognition set and weight set are transferred from external medium 104 to weight memory 110 through external interface 118. In some embodiments, other information, independent from the recognition set and weight set information, is also retrieved from external medium 104. At step 210, user interface system 113 presents this other information or the result of processing this other information to the user. For example, the information may be audio data, and user interface system 113 may play a song. Alternatively, the information may be video data and user interface system 113 may display an image, video program, or scene from a video game. At step 212, base unit 102 receives and recognizes a new user utterance but using the newly loaded recognition set and weight set information.

Steps 208, 210, and 212 repeat as often as required by the application. It is of course not necessary that new recognition weight set information be loaded after each utterance that is recognized. For example, the watch that sets time by use of speaker-independent recognition in any of several languages might have only one or two weight sets, pertinent to a specific language, downloaded from external medium 109 through step 204, once during the life of the watch.

Figure 3:
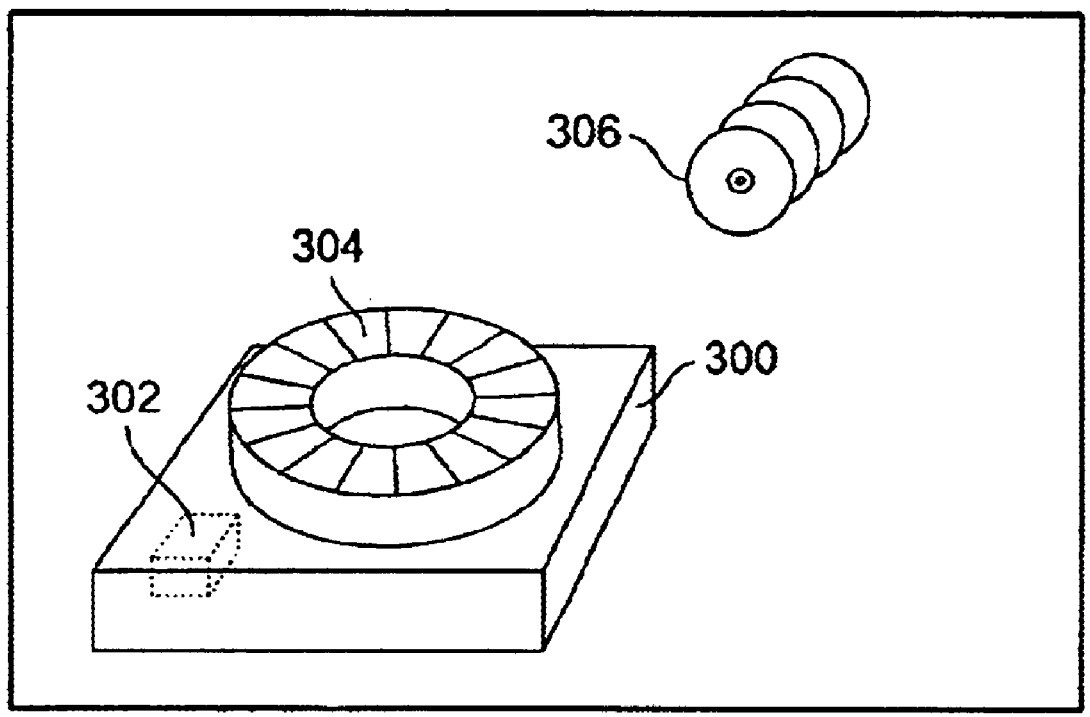
FIG. 3 depicts a particular example of the apparatus of FIG. 1, a compact disk changer enhanced in accordance with one embodiment of the present invention.

FIG. 3 depicts a particular example of the apparatus of FIG. 1, a compact disk changer enhanced in accordance with one embodiment of the present invention. A compact disk changer 300 incorporates the functionality of base unit 102 along with circuitry necessary for compact disk changer operation. An integrated circuit 302 includes feature extraction unit 106, pattern recognition system 108, and weight memory 110. Integrated circuit 302 is preferably the RSC-164 speech recognition LSI chip manufactured by Sensory, Inc., assignee of the present application. Integrated circuit 302 is also capable of synthesizing speech from stored data and this capability is utilized by the compact disk changer enhanced in accordance with the present invention. Attached to compact disk changer 300 is a "jukebox" 304, into which compact disks 306 may be loaded. Compact disks 306 perform the function of external medium 104. They store recognition weight data and other information in the form of audio data to be played.

The weight sets utilized by integrated circuit 302 are located in each of the compact disks 306. Jukebox 304 is assumed to be capable of storing as many as 24 compact disks and loading the selected disk for playing. Some of these 24 slots may be empty. For illustration, it is assumed that ten compact disks are in jukebox 304 and six of them are of the type that contain weight and recognition set information. Each of these six compact disks 306 contain weights for two sets of words, the first of which is the name of the compact disk and the second of which is the list of songs in that compact disk.

Figure 4:
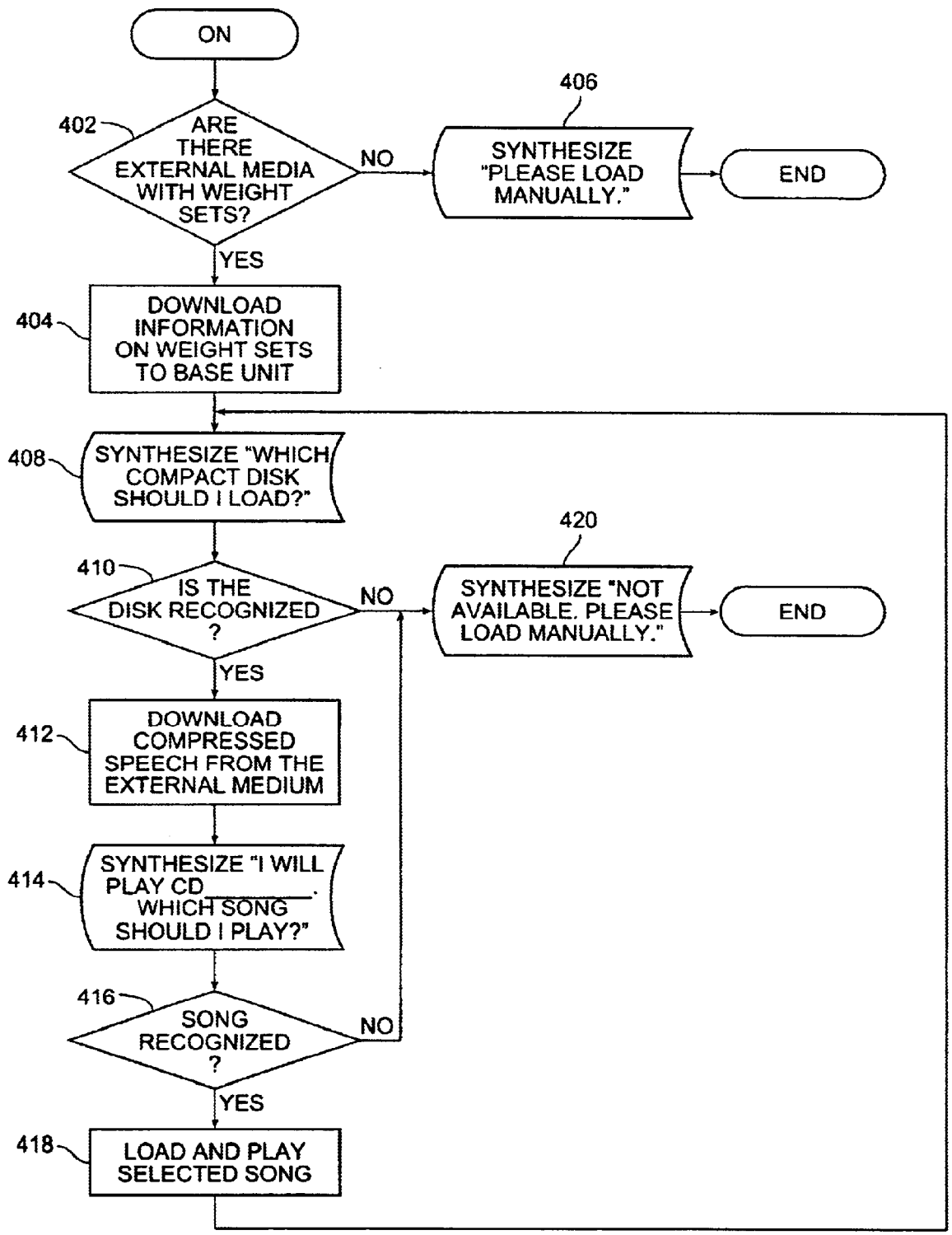
FIG. 4 depicts the operation of the compact disk changer of FIG. 3 in accordance with one embodiment of the present invention.

FIG. 4 depicts the operation of the compact disk changer of FIG. 3 in accordance with one embodiment of the present invention. After being turned on, at step 402, compact disk changer 300 scans external medium 304 and checks for appropriate signals from the six compact disks which indicate that they are of the type containing recognition weights. If the compact disks are of the correct type, compact disk changer 302 receives the required information on the number and type of weight sets in each of these compact disks at step 404. If the compact disks do not contain the weight set information, integrated circuit 302 synthesizes and outputs the spoken phrase "Please load manually" at step 406 to indicate that spoken control will not be possible.

At step 408, integrated circuit 302 then synthesizes and outputs the spoken phrase "Which compact disk should I load?" and it analyzes the audio response. The first weight set from each of the six compact disks 306 are downloaded into compact disk changer 300 and used by integrated circuit 302 to decide which of the compact disks was requested by the speaker at step 410. Suppose the compact disk with music by Montovani was selected. From that compact disk, compact disk changer 300 downloads speech data in compressed form at step 414 and generates "I will play CD Montovani." Also, at step 414, the Montovani compact disk is then loaded into the compact disk changer and integrated circuit 302 then generates the phrase "Which song should I play?" The second weight set on the Montovani compact disk is downloaded and used by integrated circuit 302 to determine which song was selected at step 416.

Compact disk changer 300 then downloads the appropriate audio data from the compact disk and plays this song at step 418 and repeats the above selection process by going to step 410. If a compact disk is requested that is not in jukebox 304 or if a song is requested that is not in the selected compact disk, integrated circuit 302 generates the phrase "Not available. Please load manually" at step 420.

Through use of the invention, a large number of utterances may be recognized by a relatively simple recognition engine because an over-large number of utterances is not contained in any recognition set. Furthermore, by use of the invention, devices that operate in a user-friendly manner are achieved because they require no training of the recognizer.

Another embodiment having features similar to those in the specific embodiment would be a computer that contains a recognition engine and that receives weight sets from software packages. In this way, the software manufacturer can add speech recognition to his word processor, spread sheet program, data base program, game, etc. For this application, external interface 118 operates to access a hard disk, CD-ROM, or floppy.

Similarly, Internet web sites can offer speech recognition by downloading weights, e.g., in the form of Java applets, to the local computer. This offers new possibilities for interactions such as learning. For example, suppose a child selects a web site for learning more about numbers. The site can download recognition sets, speech data, and screen graphics to the child's computer, which then displays a farm scene that includes 5 chickens. The downloaded speech can then say "How many chickens are there in the picture?" The child answers "five." The recognition program decides the answer and feeds this information to the web site, which sends new recognition information, speech, and graphics back to the local computer in order to say "You're right!" and to continue the interaction. This type of interactive learning tool is especially beneficial for children whose natural response is speech, not interactions with a mouse, joystick, or keyboard. For this application, external interface 118 would operate as a network interface or modem in combination with the well-known protocols for accessing the Internet.

Cable TV or satellite television transmissions can include recognition weights that are used by the receiving TV set to select programs through speech recognition. Through this capability, one can also play video games on the television set using speech as both a game output and user input during the game play, with both input and output speech synchronized with graphics on the TV screen. For this application, external interface 118 operates as an RF receiver, receiving both recognition weight information and other video and/or audio information.

While the above are complete descriptions of preferred and other embodiments of the invention, other arrangements and equivalents are possible and may be employed without departing from the true spirit and scope of the invention. The terms and expressions which have been employed here are used as terms of description and not of limitations, and there is no intention, in the use of such terms and expressions, of excluding equivalents of the features shown and described, or portions thereof, it being recognized that various modifications are possible within the scope of the appended claims and their full scope of equivalents.

What is claimed is:

1. In an electronic system wherein features of spoken utterances are analyzed by a programmable pattern recognition system to provide recognition results, a method comprising the steps of:

coupling said electronic system to a source external to said electronic system;

retrieving a first set of recognition programming information associated with a first recognition word set for said pattern recognition system from said external source;

programming said pattern recognition system with said retrieved first set of recognition programming information to recognize a first set of words in the first recognition word set, wherein said pattern recognition system provides a first set of recognition results responsive to said first set of words;

in response to the first set of recognition results, selectively retrieving from said external source a second set of recognition programming information associated with a second recognition word set for said pattern recognition system, wherein the selectively retrieved second set of recognition programming is selected based on the first set of recognition results; and reprogramming said pattern recognition system with said selectively retrieved second set of recognition programming information to recognize a second set of words in the second recognition word set, wherein said pattern recognition system provides a second set of recognition results responsive to the second set of words.

2. The method of claim 1, wherein said first recognition word set is available in a plurality of languages, and wherein said retrieved first set of recognition programming information is associated with at least one of said plurality of languages.

3. The method of claim 1, further comprising retrieving at least one voice prompt from said external source.

4. The method of claim 1, wherein said first recognition word set is in a first language, and wherein said second recognition word set is in a second language.

5. The method of claim 1, wherein the electronic system executes a first programming operation in response to the first set of recognition results, and the electronic system executes a second programming operation in response to the second set of recognition results.

6. The method of claim 1, wherein said retrieved recognition programming information comprises a first set of neural network weights and said selectively retrieved recognition programming information comprises a second set of neural network weights.

7. The method of claim 1, wherein the first recognition word set pertains to time-setting commands and the second recognition word set pertains to digits.

8. In a base unit wherein features of spoken utterances are analyzed by a programmable speaker-independent pattern recognition system to provide recognition results, a method comprising the steps of:

retrieving a first set of recognition programming information associated with a first recognition word set for said pattern recognition system from a remote source external to said base unit;

programming said pattern recognition system with said retrieved recognition programming information to recognize a first set of words in the first recognition word set, wherein said speaker-independent pattern recognition system provides a first set of recognition results responsive to said first set of words;

in response to the first set of recognition results, selectively retrieving from said remote external source a second set of recognition programming information associated with a second recognition word set for said pattern recognition system, wherein the selectively retrieved second set of recognition programming is selected based on the first set of recognition results; and reprogramming said pattern recognition system with said retrieved second set of recognition programming information to recognize a second set of words in the second recognition word set, wherein said speaker-independent pattern recognition system provides a second set of recognition results responsive to said second set of words.

9. The method of claim 8, wherein said remote external source is selected from the group consisting of wireless networks, external storage media, telephone networks, CATV, Internet networks, and Intranet networks.

10. The method of claim 8, wherein said remote external source stores an in indication that said first and second sets of recognition programming information are stored on said remote external source.

11. The method of claim 8, further comprising the step of verifying that recognition programming information is available from said remote external source.

12. The method of claim 8, further comprising the step of displaying graphical information retrieved from said remote external source.

13. The method of claim 8, further comprising retrieving information for synthesizing speech.

14. The method of claim 8, further comprising retrieving information for generating graphical displays.

15. The method of claim 8, wherein said retrieved recognition programming information includes neural network weights.

16. Apparatus for performing speaker independent speech recognition comprising:

a programmable pattern recognition system;

an interface, the interface retrieving first recognition programming information from a remote external source for programming said programmable pattern recognition system to recognize a first selected word vocabulary and generate a first recognition result when a first input is in the first selected word vocabulary, and in response to the first recognition result, selectively retrieving second recognition programming information from the remote external source for programming said programmable pattern recognition system to recognize a second selected word vocabulary and generate a second recognition result when a second input is in the second selected word vocabulary.

17. The apparatus of claim 16, wherein said interface is selected from the group of interfaces consisting of wireless network interfaces, Internet interfaces, external storage media, telephone interfaces, and CATV interfaces.

18. the apparatus of claim 16, further comprising a display that displays graphical information in response to said recognition results.

19. The apparatus of claim 16, further comprising a speech synthesis system that generates speech in response to said recognition results.

20. A speech recognition system comprising:

a microphone for receiving a first speech input signal and a second speech input signal, the first input signal being within a first recognition word set and the second input signal being within a second recognition word set;

a memory;

a programmable pattern recognition system coupled to the microphone and to the memory, the programmable pattern recognition system recognizing the first input signal when the memory is loaded with first recognition programming information associated with the first recognition word set, and recognizing the second input signal when the memory is loaded with second recognition programming information associated with the second recognition word set;

an interface circuit to couple the speech recognition system to a remote external source;

a pattern recognition programming system coupled to the programmable pattern recognition system and to the interface circuit;

wherein the pattern recognition programming system signals the interface circuit to retrieve the first recognition programming information from the remote external source into the memory to recognize the first speech input signal, and in response to recognizing the first speech input signal, the pattern recognition programming system signals the interface circuit to selectively retrieve the second recognition programming information from the remote external source into the memory to recognize the second speech input signal.

21. The speech recognition system of claim 20, further comprising a feature extraction unit coupled between the microphone and the programmable pattern recognition system, the feature extraction unit extracting characteristic features from the first and second input signals.

22. The speech recognition system of claim 20, further comprising a user interface system coupled to programmable pattern recognition system.

23. The speech recognition system of claim 22, wherein the user interface system comprises a speech synthesizer.

24. The speech recognition system of claim 23, further comprising a speaker coupled to the user interface system.

25. The speech recognition system of claim 24, wherein the user interface system generates synthesized speech to prompt a user to enter speech data in one of a plurality of recognition word sets.

26. The speech recognition system of claim 22, further comprising a graphical display.

27. The speech recognition system of claim 20, wherein the interface circuit is a modem coupled to the remote external source over a telephone line.

28. The speech recognition system of claim 20, wherein the interface circuit is coupled to the remote external source over a wireless connection.

29. In a base unit including a pattern recognition system, a method of recognizing spoken utterances comprising:

storing a plurality of sets of recognition programming information associated with a corresponding plurality of recognition word sets on an external medium, the plurality of sets of recognition programming information including a first and second set of recognition programming information corresponding to first and second recognition word sets;

retrieving the first set of recognition programming information associated with the first recognition word set for said pattern recognition system from the external medium to said base unit during a first time period, wherein the first set is selectively retrieved from the plurality of sets stored on the external medium;

programming said pattern recognition system with said retrieved first set of recognition programming information to recognize a first set of words in the first recognition word set;

prompting a user for a first speech utterance corresponding to the first recognition word set;

generating first recognition result in response to the first speech utterance;

in response to the first recognition result, selectively retrieving the second set of recognition programming information associated with the second recognition word set for said pattern recognition system from the external medium to said base unit during a second time period;

reprogramming said pattern recognition system with said retrieved second set of recognition programming information to recognize a second set of words in the second recognition word set;

prompting a user for a second speech utterance corresponding to the second recognition word set; and generating a second recognition result in response to the second speech utterance.

30. The method of claim 29, wherein the second set of recognition programming information is selectively retrieved from the external source based on the first recognition result.

31. The method of claim 29, wherein the recognition programming information comprises previously trained neural network weights.

32. The method of claim 29, wherein the base unit executes a first programming operation in response to the first recognition result, and the base unit executes a second programming operation in response to the second recognition result.

33. The method of claim 29, further comprising accessing the external medium from the base unit to verify that the external medium contains the plurality of sets of recognition programming information.

34. The method of claim 29, wherein said external medium stores an indication that said first and second sets of recognition programming information are stored on said external medium.

35. The method of claim 29, wherein in response to the first recognition result the base unit further retrieves programming information comprising audio data or video data.

* * * * *